United States Patent Office 3,476,814
Patented Nov. 4, 1969

3,476,814
PHENYL ALKYL ETHER ANTIOXIDANTS
Bernard R. Meltsner, Royal Oak, Mich., assignor to Ethyl Corporation, New York, N.Y., a corporation of Virginia
No Drawing. Filed July 9, 1965, Ser. No. 470,891
Int. Cl. C07c 43/20, 39/12; C08f 45/58
U.S. Cl. 260—613                              4 Claims

ABSTRACT OF THE DISCLOSURE

Mono- and di-(3,5-dihydrocarbyl-4-hydroxybenzyl)-phenyl alkyl ethers are useful either alone or in synergistic combination with a dialkyl thiodialkonate as antioxidants for a broad range of organic material.

---

This invention relates to new compounds useful for the stabilization of organic material. In particular, this invention relates to novel phenolic ethers that impart exceptional stability to plastics.

It is a common practice to include an antioxidant in plastic formulations to protect them from oxidative degradation during processing and during subsequent use periods. One class of antioxidant frequently used in this capacity is alkylated phenols. Although some alkylated phenols provide excellent antioxidant protection for plastics, they are often observed to break down when exposed to elevated temperatures, usually encountered during processing of the plastic. The resultant loss of antioxidant protection rapidly leads to color formation and polymer degradtion. Therefore, a need exists for a stabilizing composition that will provide antioxidant protection for plastics and which is not destroyed by the high temperatures encountered during processing.

It is an object of this invention to provide novel antioxidants and highly stable organic compositions. A further object is to provide improved plastics that are resistant to thermal and oxidative degradation. A particular object is to provide a high molecular weight polyolefin of enhanced stability.

These and other objects are accomplished by providing an antixoidant having the formula:

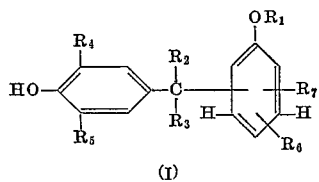

(I)

wherein $R_1$ is selected from the group consisting of alkyl radicals having 1–12 carbon atoms, aralkyl radicals having 7–12 carbon atoms, and aryl radicals having 6–12 carbon atoms, $R_2$ and $R_3$ are selected from the group consisting of hydrogen and lower alkyl radicals having 1–6 carbon atoms; $R_4$ is a hydrocarbon radical containing 1–18 carbon atoms; $R_5$ is an alpha-branched hydrocarbon radical containing 3–18 carbon atoms; $R_6$ is selected from the group consisting of hydrogen, alkyl radicals having 1–12 carbon atoms, aryl radicals having 6–12 carbon atoms and aralkyl radicals having 7–12 carbon atoms; and $R_7$ is selected from the group consisting of alkyl radicals having 1–12 carbon atoms, aralkyl radicals containing 7–18 carbon atoms and radicals having the formula:

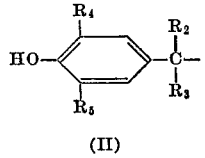

(II)

wherein $R_2$ $R_3$ $R_4$ and $R_5$ are the same as above.

In Formula I, $R_7$ and $R_8$ are bonded to positions ortho or para to the position bearing the $OR_1$ substitution. Thus, $R_6$ may be ortho and $R^7$ para, $R_7$ may be ortho and $R_6$ para, or $R_6$ and $R_7$ may both be in the ortho position. This ortho-para type substitution is shown in the formulae used herein by substituting the positions meta to the position bearing the $OR_1$ subsitution with hydrogen atoms, thus leaving only ortho and para positions to accept the three remaining radicals. Some examples of these compounds are:

2-tert-butyl-4-methyl-6(3,5-di-tert-butyl-
    4-hydroxybenzyl)anisole
2-methyl-4-isooctyl-6(3-methyl-5-tert-butyl-
    4-hydroxy-α-methylbenzyl)decoxy benzene
2-tert-butyl-4-methyl-6(3,5-diisopropyl-4-hydroxy-
    benzyl)-2,4,6-trimethyl phenoxy benzene
2-tert-butyl-4-(α-methylbenzyl)-6-(α-methyl-3,5-di-tert-
    butyl-4-hydroxybenzyl)- 2,4,6-trimethyl benzyloxy
    benzene
2,6-di-tert-butyl-4-(3,5-di-tert-butyl-4-hydroxybenzyl)
    anisole
2-tert-butyl-6-methyl-4-(3,5-di-tert-butyl-4-
    hydroxybenzyl)anisole
2,6-diisopropyl-4-(3,5-diisopropyl-4-hydroxybenzyl)
    anisole
2,6-di-(α-methylbenzyl-4-[3,5-di(α-methyl-benzyl)-
    4-hydroxybenzyl]anisole
2-methyl-4-tert-butyl-6-(3,5-di-tert-butyl-4-
    hydroxybenzyl)anisole
2,4-di-tert-butyl-6-[3,5-di(α-methylbenzyl)-4-
    hydroxybenzyl]anisole
2-isooctyl-4-methyl-6-(3-methyl-5-tert-butyl-4-hydroxy-
    α-methylbenzyl)decoxy benzene
2,4-diodecyl-6-(3,5-di-sec-octadecyl-4-hydroxybenzyl)
    dodecoxy benzene
2-methyl-4-tert-butyl-6-(3,5-diisopropyl-4-hydroxy-
    benzyl)-2,4,6-trimethylphenoxy benzene
2-(α-methylbenzyl)-4-tert-butyl-6-(α-methyl-3,5-di-tert-
    butyl-4-hydroxybenzyl)-2,4,6trimethyl-benzyloxy
    benzene In a preferred embodiment, $R_7$ in Formula I is a radical having Formula II wherein the other radical designations are the same as previously set forth. These compounds are illustrated by the following formula:

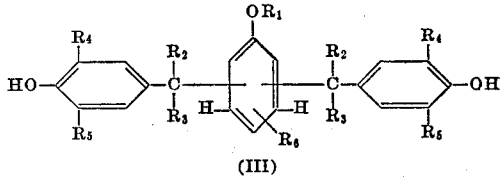

(III)

wherein $R_1$, $R_2$, $R_3$, $R_4$, $R_5$ and $R_6$ are the same as previously set forth. Some examples of these compounds include:

α,α'-(2-methoxy-5-methyl-m-phenylene)-bis-(2-methyl-6-isopropyl-p-cresol)

α,α'-(2-butoxy-5-tert-butyl-m-phenylene)-bis-[2-n-octa-decyl-6-(α-methylbenzyl)-p-cresol]

α,α'-(2-dodecoxy-5-sec-dodecyl-m-phenylene)-bis-[2,6-di-(α-methylbenzyl)-p-cresol]

α,α'-(2-phenoxy-5-tert-amyl-m-phenylene)-bis-(2-ethyl-6-sec-octyl-p-cresol)

α,α'-(4-methoxy-5-methyl-m-phenylene)-bis-(2-methyl-6-isopropyl-p-cresol)

α,α'-(4-butoxy-5-tert-butyl-m-phenylene-bis-[2-n-octa-decyl-6-(α-methylbenzyl)-p-cresol]

α,α'-(4-dodecoxy-5-sec-dodecyl-m-phenylene)-bis-[2,6-di-(α-methylbenzyl)-p-cresol]

α,α'-(4-phenoxy-5-tert-amyl-m-phenylene)-bis-(2-ethyl-6-sec-octyl-p-cresol)

In an especially preferred embodiment, $R_7$ has Formula II and $R_4$ and $R_5$ are both alpha-branched hydrocarbyl radicals. Some examples of these especially preferred antioxidant compounds include:

α,α'-(2-methoxy-5-methyl-m-phenylene)-bis-(2,6-diisopropyl-p-cresol)

α,α'-(2-hexoxy-5-tert-butyl-m-phenylene)-bis-[2,6-di-(α,α-dimethylbenzyl)-p-cresol]

α,α'-(2-phenoxy-5-dodecyl-m-phenylene)-bis-(2,6-di-sec-amyl-p-cresol)

α,α'-(4-methoxy-5-methyl-m-phenylene)-bis-(2,6-diisopropyl-p-cresol)

α,α'-(4-hexoxy-5-tert-butyl-m-phenylene)-bis-[2,6-di-(α,α-dimethylbenzyl)-p-cresol]

α,α'-(4-phenoxy-5-dodecyl-m-phenylene)-bis-(2,6-di-sec-amyl-p-cresol)

In a highly preferred embodiment of this invention, $R_7$ in Formula I is a radical of Formula II and is substituted on the benzene ring in a position ortho to the position bearing the $OR_1$ substitution and $R_6$ is substituted on the position para to the position bearing the $OR_1$ substitution. Some examples of these compounds are:

α,α'-(2-methoxy-5-ethyl-m-phenylene)-bis-(2-methyl-6-tert-butyl-p-cresol)

α,α'-[2-(2,4,6-trimethyl phenoxy)-5-methyl-m-phenylene]-bis-[2-methyl-6-(α-methylbenzyl)-p-cresol]

α,α'-[2-(2,4,6-trimethyl benzyloxy)-5-tert-amyl-m-phenylene]-bis-(2-ethyl-6-tert-octyl-p-cresol)

In a most highly preferred embodiment of this invention, $R_7$ in Formula I is a radical having Formula II and is located in the position ortho to the position bearing the $OR_1$ substitution, $R_6$ is located in the position para to the position bearing the $OR_1$ substitution, and $R_4$ and $R_5$ are both alpha-branched hydrocarbon radicals containing 3–18 carbon atoms.

A most preferred antioxidant compound of this invention is α,α'-(2-methoxy-5-tert-butyl-m-phenylene)-bis-(2,6-di-tert-butyl-p-cresol).

Another embodiment of this invention is a stabilizing composition comprising about 10–90 weight percent of a compound previously described by Formula I and about 10–90 weight percent of a sulfur compound having the formula:

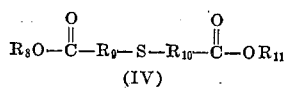
(IV)

wherein $R_9$ and $R_{10}$ are divalent hydrocarbon radicals selected from the group consisting of alkylene radicals containing about 1–6 carbon atoms and arylene radicals containing about 6–12 carbon atoms, and $R_8$ and $R_{11}$ are alkyl radicals containing about 6–20 carbon atoms.

Some examples of the compounds defined by Formula IV include: dihexylthiodiacetate, diheptylthiodivalerate, di-n-octylthiodibutyrate, di-2-octylthiodicaproate, didodecylthiodiacetate, diundecylthiodibutyrate, diheptadecylthiodivalerate, dioctadecylthiodipropionate, dinonadecylthiodibutyrate, dieicosylthiodipropionate, 4,4'-thiobis(laurylbenzoate) and 4,4'-thiobis(hexylbenzoate).

Preferred embodiments of the stabilizing compositions of this invention contain, as a phenolic constituent, about 10–90 weight percent of the preferred stabilizing compounds heretofore set forth and about 10–90 weight percent of the sulfur compound defined by Formula IV.

A preferred class of sulfur compounds are those having Formula IV wherein $R_8$ and $R_{11}$ are alkyl radicals having about 10–16 carbon atoms and $R_9$ and $R_{10}$ are divalent alkylene radicals containing about 1–3 carbon atoms. Examples of these sulfur compounds include didecylthiodiacetate, dicetylthiodipropionate and dilaurylthiodibutyrate. A most preferred sulfur compound in the stabilizing compositions of this invention is dilaurylthiodipropionate. Thus, highly preferred classes of stabilizing compositions are represented by compositions containing about 10–90 weight percent of the previous preferred classes of phenolic compounds and about 10–90 weight percent of dilaurylthiodipropionate.

A most preferred stabilizing composition of this invention comprises about 10–90 weight percent of α,α'-(2-methoxy-5-tert-butyl-m-phenylene)-bis-(2,6-di-tert-butyl-p-cresol) and about 10–90 weight percent of dilaurylthiodipropionate.

The phenolic compounds of this invention may be prepared by first alkylating a phenol in its ortho position. This is accomplished by reacting a phenol having a hydrogen atom on a carbon atom ortho to the hydroxyl group with an olefinic compound in the presence of an aluminum phenoxide catalyst. For example, 2,6-di-tert-butylphenol is conveniently prepared by reacting phenol with isobutylene in the presence of a small amount of aluminum phenoxide.

The temperatures employed in this reaction vary from about 50° C. to about 200° C., and reaction times of from about one-half hour to 10 or more hours are profitably employed to give a good yield of the product. The aluminum phenoxide catalyst may be prepared from the phenol employed in the reaction or from some other phenol. Thus, when phenol itself is a reactant in the process a small amount of aluminum phenoxide may be employed as the catalyst. This catalyst is prepared by merely heating the phenol with the desired amount of aluminum until a reaction takes place between the aluminum and phenol, forming aluminum phenoxide. To obtain the elevated temperatures sometimes necessary in the catalyst preparation and in the subsequent alkylation, pressure may be resorted to, although a pressure reaction is usually not necessary when alkylating phenol with a high molecular weight olefin such as styrene or α-methylstyrene. The preparation of the ortho-alkylated phenol starting materials is more fully described in U.S. Patent 3,075,832.

In the next step, the ortho substituted phenols are converted to 3,5-disubstituted-4-hydroxybenzyl chloride derivatives by reacting the ortho-substituted phenol with a carbonyl compound such as formaldehyde and with hydrogen chloride.

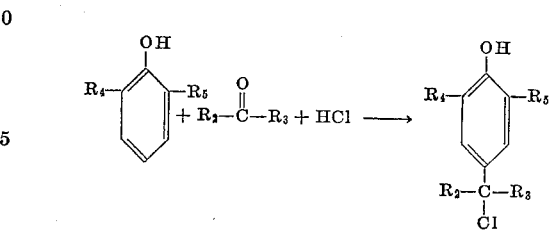

This process is more fully described in copending application Ser. No. 53,363, filed Sept. 1, 1960, now U.S. 3,257,321.

The disubstituted hydroxybenzyl chloride is then reacted with the appropriate alkoxy or aryloxy benzene derivative in a Friedel-Craft type reaction. This reaction is shown by the following equation:

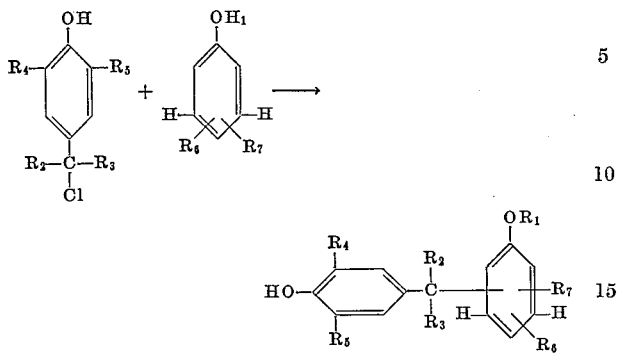

or, in the case where the alkoxy or aryloxy benzene has two unsubstituted ortho or para positions the reaction is shown by:

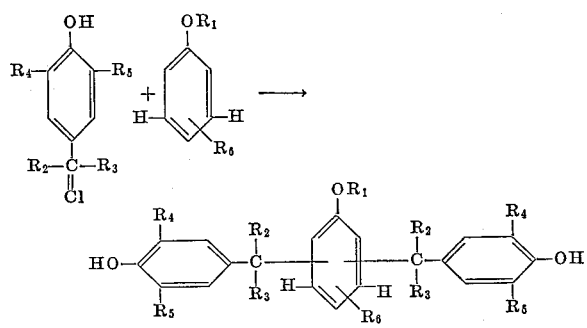

The following examples serve to illustrate the methods of preparing the phenolic additives of the present invention and are not intended to limit the invention in any manner. All parts are parts by weight unless otherwise indicated.

EXAMPLE 1

To a reaction vessel equipped with stirrer, thermometer, reflux condenser and maintained under a nitrogen atmosphere was added 100 parts water and 4 parts sodium hydroxide. When the sodium hydroxide had dissolved, 15 parts of p-tert-butylphenol were added. Following this, 15.8 parts of methanol were added, causing all the p-tert-butylphenol to dissolve. After this, 12.6 parts of dimethyl-sulfate were added. The temperature rose to 40° and an oil came out of solution. The reaction was stirred for an hour and the oil layer which had formed was separated and washed with water. Following this, the oil was dried over anhydrous sodium sulfate, yielding 10 parts of a material which was identified by infrared analysis as p-tert-butyl anisole.

In a second reaction vessel equipped with stirrer, thermometer, reflux condenser and maintained under nitrogen was placed 20 parts of hexane, 8.8 parts of 3,5-di-tert-butyl-4-hydroxybenzyl chloride, 2.83 parts of the p-tert-butyl anisole prepared above and 0.2 part of anhydrous stannic chloride. It was refluxed for two hours, during which period HCl was evolved. It was then cooled to room temperature, washed with water and then dried over anhydrous sodium sulfate. The hexane solvent was then evaporated, leaving a residue which was crystallized from petroleum ether, yielding 4 parts of white crystals having a melting point of 149–151° C. These crystals were identified as α,α'-(2-methoxy-5-tert-butyl-m-phenylene)-bis-(2,6-di-tert-butyl-p-cresol) by carbon and hydrogen analyses which showed them to contain 82.2 percent carbon and 10.1 percent hydrogen. The calculated composition for α,α'-(2-methoxy-5-tert-butyl-m-phenylene)-bis-(2,6-di-tert-butyl-p-cresol) is carbon, 82.0 percent, and hydrogen, 10.66 percent.

EXAMPLE 2

To a reaction vessel equipped as in Example 1 is added 509 parts of 3,5-di(α-methylbenzyl)-4-hydroxybenzyl chloride and 450 parts of hexane. Following this, is added 266 parts of p-sec-dodecyl anisole and 5 parts of stannic chloride. The mixture is refluxed for 4 hours. Following this, the reaction mass is water washed with 500 parts of water and the hexane layer dried over anhydrous sodium sulfate. After filtering off the sodium sulfate, the hexane is evaporated from the filtrate, leaving behind a residue which is recrystallized from petroleum ether, yielding α,α'-(2-methoxy-5-sec-dodecyl-m-phenylene)-bis-[2,6-di-(α-methylbenzyl)-p-cresol] in good yield.

EXAMPLE 3

To a reaction vessel fitted as in Example 1 is added 266.5 parts of 2-methyl-6-tert-butyl-α-chloro-α-methyl-p-cresol and 500 parts of isooctane. Following this, 234 parts of 2,4-di-tert-butylethoxy benzene and 10 parts of anhydrous zinc chloride are added. The mixture is refluxed for 4 hours, following which it is washed with 500 ml. of water. The isooctane solution is dried over anhydrous sodium sulfate, following which the isooctane is removed by distillation, leaving a residue which is recrystallized from petroleum ether, yielding 2,4-di-tert-butyl-6-(3-methyl-4-hydroxy-5-tert-butyl-α-methylbenzyl)ethoxybenzene in good yield.

EXAMPLE 4

To a reaction vessel equipped as in Example 1 is added 400 parts of hexane and 254.5 parts of 2,6-di-isopropyl-α,α-dimethyl-α-chloro-p-cresol. Following this, 6 parts of anhydrous stannic chloride and 282 parts of 2,4-dimethyl-(2,6-dimethyl-4-tert-butyl-phenoxy)-benzene are added. The mixture is refluxed for 6 hours, following which it is water washed to remove the catalyst. The solution is then dried over anhydrous sodium sulfate and the hexane evaporated, leaving a residue which is recrystallized from petroleum ether, yielding 2,4-dimethyl-6-(3,5-diisopropyl-4-hydroxy-α,α-dimethylbenzyl)-2,6-dimethyl-4-tert-butyl-phenoxybenzene in good yield.

EXAMPLE 5

To a reaction vessel fitted as in Example 1 is added 408.5 parts of 2-methyl-6-tert-octadecyl-α-chloro-p-cresol and 750 parts of hexane. Following this, there is added 422 parts 4-tert-butyl-2-(α-methylbenzyl)dodecoxy benzene and 5.0 parts of anhydrous stannic chloride. The mixture is refluxed for 6 hours, following which it is water washed, dried over anhydrous sodium sulfate and the solvent evaporated, leaving a residue which is recrystallized from petroleum ether, yielding 2-(α-methylbenzyl)-4-tert-butyl-6-(3-methyl-4-hydroxy-5-tert-octadecylbenzyl)-dodecoxy-benzene in good yield.

EXAMPLE 6

To a reaction vessel fitted as in Example 1 is added 2000 parts of hexane and 511 parts of 3,5-di-tert-butyl-4-hydroxybenzyl chloride. Following this, there is added 164 parts of o-tert-butyl anisole. After this, 25 parts of anhydrous stannic chloride is added. The mixture is refluxed for 4 hours, following which it is water washed, dried over anhydrous sodium sulfate and the solvent removed by evaporation. The residue is recrystallized from petroleum ether, yielding 2-tert-butyl-4,6-di-(3,5-di-tert-butyl-4-hydroxybenzyl)anisole.

EXAMPLE 7

To a reaction vessel equipped as in Example 1 is added 1500 parts of hexane and 255.5 parts of 3,5-di-tert-butyl-4-hydroxybenzyl chloride. Following this, there is added 220 parts of 2,6-di-tert-butyl anisole and 20 parts of anhydrous stannic chloride. The mixture is refluxed for 8 hours, following which it is water washed to remove the catalyst, dried over anhydrous sodium sulfate and the solvent removed by evaporation. The residue remaining is recrystallized from petroleum ether, yielding 2,6-di-tert-butyl-4-(3,5-di-tert-butyl-4-hydroxybenzyl)anisole.

From the foregoing examples, it can be seen that many other benzyl chloride derivatives can be reacted with the appropriate phenyl ether derivatives to yield any one of the phenolic additive compounds embodied in the present invention.

The sulfur compounds used in the stabilizing compositions of this invention are readily available or can be made using standard synthetic procedures. For example, dialkylthiodipropionate can be made from the reaction of hydrogen sulfide with alkyl acrylates. Another method of preparing the thiobis compounds is from the reaction of halogenated acid esters, such as γ-chlorostearylpropionate, with sodium sulfide. Thiobis aromatic esters can be prepared from the reaction of benzoate esters or derivatives thereof with sulfur dichloride in the presence of a Lewis acid catalyst such as aluminum chloride. The following examples will illustrate some of these preparative methods. All parts are parts by weight unless otherwise indicated.

EXAMPLE 8

In a pressure vessel fitted with an agitator, means for delivering hydrogen sulfide and heating and cooling means is placed 592 parts of hexadecylacrylate and 1000 parts of hexane. The vessel is sealed and, while stirring, hydrogen sulfide is passed into the vessel until 200 p.s.i.g. is attained. The temperature is then slowly raised to 100° C. and stirring continued for 4 hours. Following this, the vessel contents are cooled and the residual pressure vented. The contents are discharged into a second vessel and water washed. The organic layer is separated and the hexane evaporated therefrom, leaving dicetylthiodipropionate.

EXAMPLE 9

In a reaction vessel equipped as in Example 1 is placed 609 parts of lauryl-δ-chlorovalerate and 1000 parts of dioxane. Eighty parts of sodium sulfide are added and, while stirring, the reaction mass is heated to reflux. Reflux is continued for 4 hours, following which the vessel contents are discharged into 1000 parts of water, whereupon dilaurylthiodivalerate precipitates.

EXAMPLE 10

In a reaction vessel equipped with a stirrer, thermometer, reflux condenser and addition funnel is placed 750 parts of octadecyl benzoate, 100 parts of aluminum chloride and 1,000 parts of hexane. One hundred and five parts of sulfur dichloride are placed in the addition funnel. The reaction vessel contents are heated to 50° C. while stirring, and, while maintained at this temperature, the sulfur dichloride is slowly added over a period of one hour. Following this, the reaction temperature is increased to reflux, and reflux is continued for 4 more hours. Following this, the vessel contents are cooled and water washed. The hexane is then evaporated from the organic layer, leaving 3,3'-thiobis (octadecyl benzoate).

The compounds and stabilizing compositions of this invention find important utility as antioxidants in a wide variety of oxygen sensitive materials. Thus, liquid hydrocarbon fuels such as gasoline, kerosene and fuel oil are found to possess greatly increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils; waxes; soaps and greases; plastics; organometallic compositions such as tetraethyllead and tetraethyllead antiknock fluids; elastomers, including natural rubber; crankcase lubricating oils; lubricating greases; and the like, greatly increase their resistance to deterioration in the presence of air, oxygen or ozone.

The compounds of this invention are also very effective antioxidants for high molecular weight hydrocarbon polymers, such as polybutadiene, methyl rubber, polybutene rubber, natural rubber, butyl rubber, GR–S rubber, GR–N rubber, piperylene rubber, dimethyl butadiene rubber, ethylene-propylene rubber, ethylene-propylene terpolymer, and the like.

The compounds of this invention are also useful in protecting petroleum wax—paraffin wax and micro-crystalline wax—against oxidative deterioration. The compounds of this invention also find use in the stabilization of edible fats and oils of animal or vegetable origin which tend to become rancid, especially during long periods of storage, because of oxidative deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter, fat, lard, beef tallow, and the like.

An important embodiment of the present invention is rubber containing, as an antioxidant therefor, a compound having Formula I. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.001 to about 5.0 percent.

As used in this description, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and copolymers exemplified by the butadiene-styrene (GR–S) and butadiene-acrylonitrile (GR–N or Paracril) rubbers and the like, although the invention is applicable to the stabilization of any rubbery, high molecular weight organic material which is normally susceptible to deterioration in the presence of oxygen, air, or ozone. The nature of these rubbers is well known to those skilled in the art.

Among the definite advantages provided by this invention is that the present rubber compositions possess unusually great resistance against oxidative deterioration. Moreover, these compositions exhibit excellent non-staining, and non-discoloration characteristics. Furthermore the novel stabilizer is relatively inexpensive and easily prepared, and possesses the highly beneficial property of low volatility. As is well known, a highly desirable feature of a rubber antioxidant is that it have a low volatility so that it remains admixed with the rubber during vulcanization and related process steps.

The present invention will be still further apparent from the following specific examples wherein all parts and percentages are by weight.

EXAMPLE 11

To a synthetic rubber master batch comprising 100 parts of SB–R rubber having an average molecular weight of 60,000, 50 parts of mixed zinc propionate-stearate, 50 parts of carbon black, 5 parts of road tar, 2 parts of sulfur and 1.5 parts of mercaptobenzothiazole is incorporated 1.5 parts of 2-methyl-4-tert-butyl-6(3,5-ditert-butyl-4-hydroxybenzyl)anisole. This batch is then cured for 60 minutes at 45 p.si. of steam pressure.

EXAMPLE 12

Two parts of 2,4-di-tert-butyl-6-[3,5-di(α-methylbenzyl)-4-hydroxybenzyl]anisole is incorporated in 100 parts of raw butyl rubber prepared by the copolymerization of 90 percent of isobutylene and 10 percent of isoprene.

EXAMPLE 13

To 200 parts of raw butyl rubber prepared by copolymerization of 95 percent of isobutylene and 5 percent of butadiene is added 1.5 parts of 2-isooctyl-4-methyl-6-(3-methyl - 5 - tert-butyl-4-hydroxy-α-methylbenzyl) decoxy benzene and 1.0 parts dilaurylthiodipropionate.

EXAMPLE 14

To a master batch of GR–N synthetic rubber comprising 100 parts of GR–N rubber, 5 percent of zinc stearate, 50 parts of carbon black, 5 parts of road tar, 2 parts of sulfur and 2 parts of mercaptobenzothiazole is added 5 percent based on the weight of the batch of 2,4-didodecyl-6-(3,5-di-sec-octadecyl-4-hydroxybenzyl)dodecoxy benzene.

EXAMPLE 15

To natural rubber (Hevea) is added 0.1 percent of 2-methyl-4-tert-butyl-6-(3,5-diisopropyl - 4 - hydroxybenzyl)-2,4,6-trimethyl phenoxy benzene.

EXAMPLE 16

A butadiene-acrylonitrile copolymer is produced from butadiene-1,3 and 32 percent of acrylonitrile. Two percent (based on the dry weight of the copolymer) of 2-(α-methylbenzyl)-4-tert-butyl-6-(α-methyl-3,5-di-tert-butyl-4-hydroxybenzyl)-2,4,6-trimethyl benzyloxy benzene is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

The amount of stabilizer employed in the rubber compositions of this invention varies from about 0.01 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional heat, stress, and the like, the use of relatively high concentrations of this inhibitor is advantageous. On the other hand, when the article of manufacture is not to be subjected to such severe conditions, relatively low concentrations can be successfully utilized. Generally speaking, amounts ranging from about 0.1 to about 3 percent by weight give uniformly satisfactory results.

Other rubbers and elastomers which can be preserved according to this invention are the rubbery polymerizates of isoprene, butadiene-1,3, piperylene; also the rubbery copolymer of conjugated dienes with one or more polymerizable monoolefinic compounds which have the capability of forming rubber copolymers with butadiene-1,3, outstanding examples of such monoolefinic compounds being those having the group $CH_2=C$, exemplified by styrene. Examples of such monoolefins are styrene, vinyl naphthalene, alphamethyl styrene, para-chlorostyrene, dichlorostyrene, acrylic acid, methyl acrylate, methyl methacrylate, methacrylonitrile, methacrylamine, methyl vinyl ether, methyl vinyl ketone, vinylidine chloride, vinyl carbazole, vinyl pyridines, alkyl-substituted vinyl pyridines, etc. In fact, excellent stabilization is achieved by incorporating a compound of this invention in any of the well-known elastomers which are normally susceptible to deterioration in the presence of air, such as elastoprenes, elastolenes elastothiomers and elastoplastics.

The novel compounds of this invention are also effective antioxidant additives for olefinic polymers. Thus, an embodiment of this invention is a novel composition of matter comprising a high molecular weight polyolefin and a small antioxidant quantity, up to 5 percent, of a compound of this invention.

The polyolefins which are stabilized by the practice of this invention include polymers obtained from the polymerization of a hydrocarbon monoolefin having up to 5 carbon atoms. Examples of such monomers include ethylene, propylene, butylene and isobutylene. Thus, the polymers are homopolymers and copolymers of ethylene, propylene, butylene, isobutylene and the various pentenes and also ethylene-propylene terpolymers.

A particularly preferred embodiment of this invention is polypropylene containing a small antioxidant quantity, up to about 5 percent, of a composition comprising about 10–90 weight percent of α,α'-(2-methoxy-5-tert-butyl-m-phenylene)-bis-(2,6-di-tert-butyl-p-cresol) and about 10 to 90 weight percent dilaurylthiodipropionate.

Polypropylene is a hydrocarbon polymer derived from the polymerization of propylene. This polymerization can be accomplished by a great variety of methods which lead to products of diverse properties. Polypropylene of any nature may advantageously be utilized for preparing compositions according to the present invention. The polymers of propylene which are employed may, for example, be similar to those which may be obtained by polymerizing propylene in a basic aqueous medium and in the presence of polymerization favoring quantities of oxygen under relatively high pressures in excess of 500 of 1,000 atmospheres at temperatures between 150 and 275° C. Or, if desired, they may be similar to the essentially linear polymers ordinarily having greater molecular weights which may be obtained under relatively low pressures of 1 to 100 atmospheres using such catalysts to polymerize the propylene as mixtures of strong reducing agents and compounds of group IVB, VB and VIB metals of the Period System; chromium oxide on silicated alumina; hexavalent molybdenum compounds; and charcoal supported nickel-cobalt. The polypropylene may be prepared using aluminum alkyls and metal halides as catalysts. The polypropylene which results from these various polymerization processes may have a molecular weight in the range from 1300 to over 1,000,000 depending on the particular conditions of polymerization employed.

There are several methods available for preparing the inhibited hydrocarbon polymer compositions of this invention. Thus, the blending of the antioxidant of this invention with a polymer such as, for example, polypropylene, may be carried out on open rolls, on internal mixers or may be accomplished by mixing with extrusion. It is also possible to prepare concentrated batches of the polymer containing excessive amounts of the additive and then mix the concentrate with additional polymer to prepare a composition of this invention. The preferred method of compounding the polymers is by milling on heated open rolls at elevated temperatures by methods well known to the art. The temperature range employed is sometimes critical as certain polypropylenes will not melt at low temperatures and tend to stick to the rolls at high temperatures. It is during this milling operation that polypropylene encounters its most severe test. The antioxidant may be initially mixed with the polymer in the dried state or it may be first dissolved in a suitable solvent, then sprayed on the polymer and milled in.

The stabilizing compositions of this invention have been found to be greatly superior to other phenolic stabilizing compositions, and even to other compositions wherein a similar phenolic additive is employed. The following tests were conducted to show the superior properties of the additives of this invention. The stabilizing compositions were incorporated into polypropylene and the resultant stabilized polymer subjected to a milling operation on rollers exposed to the atmosphere and maintained at 425° F., until signs of polymer degradation became discernible. These test conditions simulate the temperature and air exposure encountered during the processing of plastic materials by fabricators. The procedure followed was to first bring the rollers to operating temperature and then to pour the polypropylene polymer, in granular form, together with the stabilizing compositions onto the hot rollers, whereupon the polypropylene melted and became thoroughly mixed with the stabilizing composition. The hot milling operation was then continued until the polymer showed signs of breakdown manifest by either discoloration of the polymer or a decrease in viscosity, evidenced by polymer flow, indicating a decrease in average molecular weight. The test criteria was the time lapse before these indications of polymer degradation were observed. The results obtained using a stabilizing composition of this invention (A) were compared with results obtained with other phenolic compositions (B and C). The three stabilizing compositions were as follows:

(A) 50% α,α'-(2-methoxy-5-tert-butyl-m-phenylene)
   bis(2,6-di-tert-butyl-p-cresol)
   50% dilaurylthiodipropionate
(B) 50% α,α'-(2-hydroxy-5-tert-butyl-m-phenylene)
   bis(2,6-di-tert-butyl-p-cresol)
   50% dilaurylthiodipropionate
(C) 50% 1,3,5-trimethyl-2,4,6-tri-(3,5-di-tert-butyl-4-hydroxybenzyl)benzene
   50% dilaurylthiodipropionate The results obtained when 0.4 weight percent of each of the above stabilizing compositions was added to polypropylene and the polypropylene then subjected to the foregoing test were as follows.

| Stabilizer | Minutes to failure |
|---|---|
| A | [1] 102 |
| B | [2] 30 |
| C | [1] 75 |

[1] Polymer breakdown.
[2] Turned yellow.

Thus, it is seen that the stabilizer compositions of this invention represented by Stabilizer A are eminently suited for protecting organic materials against the destructive effects of heat and oxygen.

The following examples further illustrate this invention. In these examples, the stabilizer composition is designated by a letter which represents the following compositions based upon weight percent active ingredient.

(A) 50%—α,α'-(2-methoxy-5-tert-butyl-m-phenylene)
   bis(2,6-di-tert-butyl-p-cresol)
   50%—dilaurylthiodipropionate
(B) 90%—α,α'-(2-methoxy-5-methyl-m-phenylene)bis
   (2-methyl-6-isopropyl-p-cresol)
   10%—distearylthiodipropionate
(C) 10%—α,α'-(4-butoxy-5-tert-butyl-m-phenylene)bis
   [2-n-octadecyl-6-(α-methylbenzyl)-p-cresol]
   90%—dihexylthiodivalerate
(D) 75%—α,α'-(2-dodecoxy-5-sec-dodecyl-m-phenylene)bis[2,6-di-(α-methylbenzyl)-p-cresol]
   25%—di-2-octylthiodicaproate
(E) 25%—α,α'-(2-phenoxy-5-tert-amyl-m-phenylene)bis
   (2-ethyl-6-sec-octyl-p-cresol)
   75%—diundecylthiodipropionate
(F) 50%—α,α'-(2-methoxy-5-methyl-m-phenylene)bis
   (2,6-diisopropyl-p-cresol)
   50%—dinonadecylthiodipropionate
(G) 50%—2,4-di-tert-butyl-6-[3,5-di(α-methylbenzyl)-4-hydroxybenzyl]anisole
   50%—dieicosylthiodipropionate
(H) 60%—2-methyl-4-tert-butyl-6-(3,5-diisopropyl-4-hydroxybenzyl)-2,4,6-trimethylphenoxy benzene
   40%—dihexadecylthiodi(β-methylpropionate)
(I) 40%—α,α'-(2-methoxy-5-methyl-m-phenylene)bis
   (2,6-diisopropyl-p-cresol)
   60%—3,3'-thiobisoctadecylcarboxylate
(J) 70%—α,α'-(2-hexoxy-5-tert-butyl-m-phenylene)bis
   [2,6-di(α,α'-dimethylbenzyl)-p-cresol]
   30%—dicetylthiodipropionate
(K) 30%—α,α'-(2-phenoxy-5-dodecyl-m-phenylene)bis
   (2,6-di-sec-amyl-p-cresol)
   70%—dioctadecylthiodi(β-ethylpropionate)
(L) 20%—2-methyl-4-tert-butyl-6-(3,5-di-tert-butyl-4-hydroxybenzyl)anisole
   80%—dilaurylthiodipropionate
(M) 50%—2,6-di-tert-butyl-4-(3,5-di-tert-butyl-4-hydroxybenzyl)anisole
   50%—dilaurylthiodipropionate Examples of the hydrocarbon polymer compositions of this invention prepared as described above wherein the stabilizer used is given a letter designation follow. All parts and percentages are by weight in these examples.

EXAMPLE 17

To 1,000 parts of a solid polypropylene polymer having a density of 0.905 and a Rockwell hardness greater than 85, and which is isotactic, is added and blended 5 parts of Stabilizer A.

EXAMPLE 18

To an isotactic polypropylene having a tensile strength greater than 4300 p.s.i. and a compressive strength of about 9000 p.s.i. is added sufficient Stabilizer B, to give a composition containing 0.5 percent of the compound.

EXAMPLE 19

To a wax-like polypropylene having a melting point above 130° C. and a molecular weight of about 4,000, a density of 0.913, is added 0.01 percent of Stabilizer C.

The antioxidant is added to the polypropylene in the molten state and the mixture is allowed to solidify into the desired shape. A polypropylene product of outstanding oxidative stability results.

EXAMPLE 20

To 1,000 parts of polyethylene produced by oxygen catalyzed reaction under a pressure of 20,000 atmospheres and having an average molecular weight of 40,000 is added and mixed 2 parts of Stabilizer D.

EXAMPLE 21

To 100 parts of polyisobutylene having an average molecular weight of 100,000 is added 0.5 part of Stabilizer E.

EXAMPLE 22

To a master batch of high molecular weight polypropylene having an average molecular weight of about 1,000,000, a tensile strength of 6,700 p.s.i., a Shore D hardness of 74 and a softening temperature under low load of 150° C. is added 5 percent of Stabilizer F.

EXAMPLE 23

A linear polyethylene having a high degree of crystallinity, up to 93 percent and below one ethyl branched chain per hundred carbon atoms, a density of about 0.96 gram per milliliter and which has about 1.5 double bonds per 100 carbon atoms is treated with $50 \times 10^{-6}$ roentgens of β-radiation. To the thus irradiated polymer is added 0.005 percent of Stabilizer G.

EXAMPLE 24

To an ethylene-proplyene terpolymer is added one percent of Stabilizer H. After milling in the antioxidant, an extremely oxidation resistant synthetic rubber results.

EXAMPLE 25

Two parts of Stabilizer I are added with milling to 100 parts of a low density polyethylene prepared by high pressure polymerization and which has an average molecular weight of 18,000 to 20,000. The resulting product is vastly improved in its oxidative stability.

EXAMPLE 26

To 10,000 parts of a polyethylene having an average molecular weight of about 100,000 and which has a tensile strength of 5,400 p.s.i., a Shore D hardness of 70 and a softening temperature of 130° C. under low load is added 10 parts of Stabilizer J, to prepare a composition of outstanding oxidative stability.

EXAMPLE 27

To the polyethylene in Example 15 is added 0.05 percent of Stabilizer K. The resulting composition has improved antioxidant characteristics.

EXAMPLE 28

To a polyisobutylene polymer having an average molecular weight of 35,000 is added sufficient Stabilizer L, to give a composition containing 0.03 percent of the antioxidant. The composition has improved antioxidant properties due to the presence of the additive.

EXAMPLE 29

To a polypropylene polymer having an average molecular weight of 500,000 is added sufficient Stabilizer M, to give a composition containing 0.5 percent of the stabilizing composition. The resulting composition has improved heat stability and anti-oxidant properties due to the presence of the additive mixture.

In addition to the antioxidant of this invention, the saturated hydrocarbon polymers may contain other compounding and coloring additives including minor proportions of carbon black, elastomers, polyvinyl compounds, carboxylic acid esters, ureaaldehyde condensation products, flame retarding agents such as antimony trioxide and chlorinated hydrocarbons and various pigment compositions designed to impart color to the finished product.

In general, the amount of antioxidant employed in the hydrocarbon polymers of this invention varies from about 0.001 percent to about 5 percent or more. Most polymers are adequately protected with concentrations ranging from 0.01 to about 1 percent.

The following examples illustrate various other embodiments of this invention. The physical characteristics of the illustrative oils used in Examples 30–35 are shown in the following table.

PROPERTIES OF REPRESENTATIVE PETROLEUM HYDROCARBON OILS

| Oil | A | B | C | D | E | F |
|---|---|---|---|---|---|---|
| Gravity at 60° API | 30.3 | 30.5 | 28.8 | 31.1 | 20.5 | 31.0 |
| Viscosity, Saybolt: | | | | | | |
| Seconds at 100° F | 178.8 | 373.8 | 309.8 | 169.0 | 249.4 | 335.4 |
| Seconds at 210° F | 52.0 | 58.4 | 63.8 | 51.5 | 45.7 | 68.4 |
| Viscosity Index | 154.2 | 107.4 | 141.9 | 157.8 | 35.8 | 144.4 |
| Pour Point | −30 | +10 | −20 | −15 | | 0 |
| Flash Point | 410 | 465 | | | 365 | 385 |
| Sulfur, Percent | 0.2 | 0.3 | 0.3 | 0.3 | 0.3 | 0.1 |

The stabilizing additives employed are as follows:

(N) 2-dodecyl-4-tert-butyl-6-(3,5-di-tert-butyl-4-hydroxy-benzyl)anisole (O) α,α'-(2-methoxy-5-methyl-m-phenylene)-bis-(2-octadecyl-6-isopropyl-p-cresol)

(P) α,α'-(2-methoxy-5-tert-butyl-m-phenylene)-bis-(2,6-diisopropyl-p-cresol)

(Q) α,α'(2-hexoxy-5-tert-butyl-m-phenylene)-bis-[2,6-di(α-methylbenzyl)-p-cresol]

(R) 50%—α,α'-(2-methoxy-5-tert-butyl-m-phenylene)-(2,6-di-tert-butyl-p-cresol)
50%—dilaurylthiodipropionate (S) 90%—α,α'-(2-butoxy-5-tert-butyl-m-phenylene)-bis-(2,6-di-tert-butyl-p-cresol)
10%—dieicosylthiodipropionate (T) 10%—α,α'-(2-hexoy-5-isooctyl-m-phenylene)-bis-[2,6-di(α,α-dimethylbenzyl)-p-cresol]
90%—distearyllauryldibutyrate (U) 75%—2-methyl-4-tert-butyl-6-(3,5-di-tert-butyl-4-hydroxybenzyl)-2,4,6-trimethylphenoxy benzene
25%—dilaurylthiodi-β-ethylpropionate (V) 25%—2,6-di-tert-butyl-4-[3,5-di-(α-methylbenzyl)-4-hydroxybenzyl]anisole
75%—dinonadecylthiodipropionate

EXAMPLE 30

To 100,000 parts of Oil A is added, with stirring, 12 parts (0.012 percent) of Stabilizer N. The resulting oil is found to possess improved resistance to oxidative deterioration.

EXAMPLE 31

To 100,000 parts of Oil B is added 2,000 parts (2 percent) of Stabilizer O. On agitating this mixture, a homogeneous solution results and the resulting oil composition possesses enhanced oxidation resistance.

EXAMPLE 32

With 100,000 parts of Oil C is blended 50 parts (0.05 percent) of Stabilizer P. The resulting oil possesses enhanced resistance against oxidative deterioration.

EXAMPLE 33

To 100,000 parts of Oil D is added 100 parts (0.1 percent) of Stabilizer Q. The resulting oil is found to possess enhanced resistance against oxidative deterioration.

EXAMPLE 34

With 100,000 parts of Oil E is blended 5 parts (0.005 percent) of Stabilizer R. After mixing, the resulting oil possesses enhanced resistance to oxidation.

EXAMPLE 35

To 100,000 parts of Oil F is added 150 parts (0.15 percent) of Stabilizer S. The resulting oil possesses enhanced resistance against oxidative deterioration.

EXAMPLE 36

With 100,000 parts of di-(sec-amyl) sebacate having a viscosity at 210° F. of 33.8 Saybolt Universal Seconds (SUS), a viscosity index of 133 and a molecular weight of 342.5 is blended 100 parts (0.1 percent) of Stabilizer T. The resulting diester lubricant possesses greatly enhanced resistance against oxidative deterioration.

EXAMPLE 37

To 100,000 parts of di-(2-ethylhexyl) sebacate having a viscosity at 210° F. of 37.3 SUS, a visocsity index of 152 and a molecular weight of 426.7 is added 1,000 parts (1 percent) of Stabilizer U. After mixing, the resultant diester lubricant possesses greatly enhanced oxidation resistance.

EXAMPLE 38

To 100,000 parts of di-(2-ethylhexyl) adipate having a viscosity at 210° F. of 34.2 SUS, a viscosity index of 121 and a molecular weight of 370.6 is added 2,000 parts (2 percent) of Stabilizer V. After mixing, the resultant diester lubricant possesses outstanding resistance against oxidative deterioration.

Most lubricant compositions are adequately protected by the inclusion of from 0.01 to about 5 percent of an antioxidant of this invention. However, in some cases, it is desirable to add amounts outside this range.

The compounds of this invention effectively stabilize such lubricating and industrial oils as crankcase lubricating oils, transformer oils, turbine oils, transmission fluids, cutting oils, gear oils, industrial oils, mineral white oils, glass annealing oils, oils thickened with soaps and inorganic thickening agents (grease), and, in general, engine and industrial oils which are derived from crude petroleum and are normally susceptible to deterioration in the presence of air, particularly at elevated temperatures and most particularly in the presence of iron oxide. Furthermore, the novel compounds of this invention very effectively enhance the oxidation resistance of such diester oils of diethyl oxalate; di-sec-butyl malonate; di-(2-hexyl) succinate; di-(isoheptyl) pimelate; di-(3-decyl) suberate; di-sec-amyl glutarate; di-(isobutyl) glutarate; di-(2-ethylbutyl) glutarate; di-(2-ethylhexyl) glutarate; di-sec-amyl adipate; di-(3-methylbutyl) adipate; diethyl adipate; di-2-ethylhexyl adipate; di-sec-amyl azelate; di-(isobutyl) azelate; di-(2-ethylbutyl) azelate; di-(2-ethylhexyl) azelate; di-sec-amyl sebacate; di-sec-butyl sebacate; di-(2-ethylhexyl) sebacate; the glutarates, adipates, azelates and sebacates of branched chain secondary alcohols, such as undecanol, tetradecanol; etc.; and, in general, diesters of the type described in the literature as useful for synthetic lubricant purposes.

In the lubricant compositions of this invention effective use can be made of other additives which are known to the art, such as other inhibitors, detergent-dispersants, pour point depressants, viscosity index improvers, antifoam agents, rust inhibitors oiliness or film strength agents, dyes and the like. Of the inhibitors which can be effectively used in combination with our inhibitors are sulfurized sperm oil, sulfurized terpenes, sulfurized paraffin wax olefins, aromatic sulfides, alkyl phenol sulfides, lecithin, neutralized dithiophosphates, phosphorus pentasulfide-terpene reaction products, diphenylamine, phenylnaphthyl amine, β-naphthol, pyrogallol, and the like. Typical of the detergent additives that can be used in the compositions of this invention are metallic soaps of high molecular weight acids, such as aluminum naphthenates, calcium phenyl stearates, calcium alkyl salicylates, alkaline earth metal petroleum sulfonates, alkaline earth metal alkyl phenol sulfides (barium amyl phenol sulfide, calcium octyl phenol disulfide, etc.), metal salts of wax-substituted phenol derivatives, and the like. Of the viscosity index improvers and pour point depressants, effective use can be made of polymers of the esters of methacrylic acids, highly fatty alcohols and the corresponding polymers of esters of acrylic acid and higher fatty alcohols. These and other additives which can be employed in the compositions of this invention will now be well known to those skilled in the art.

The following examples illustrate some further organic materials normally susceptible to oxidative deterioration containing the stabilizing compounds and compositions of the present invention. In these examples the stabilizers employed are as follows:

(W) 2,4-didodecyl-6-(3,5-didodecyl-4-hydroxybenzyl) anisole
(X) α,α'-(2-octyloxy-5-sec-octyl-m-phenylene)-bis-[2,6-di(α,α-dimethylbenzyl)-p-cresol]
(Y) α,α'-(2-heptoxy-5-tert-butyl-m-phenylene)-bis-[2,6-di(α,α-dimethylbenzyl)-p-cresol]
(Z) 50%—α,α'-(2-ethoxy-5-tert-butyl-m-phenylene)-bis(2,6-di-tert-butyl-p-cresol)
50%—dilaurylthiodipropionate
(AA) 90%—α,α'-(2-methoxy-5-dodecyl-m-phenylene)-bis-(2,6-di-tert-butyl-p-cresol)
10%—didecylthiodipropionate

EXAMPLE 39

To 1,000 parts of gasoline having 44.0 percent paraffins, 17.9 percent olefins and 38.1 percent aromatics, an initial evaporation temperature of 94° F. and a final evaporation temperature of 119° F. is added 10 parts of Stabilizer W. The mixture is agitated to dissolve the stabilizer. The resulting fuel has an excellent stability to oxidative deterioration.

EXAMPLE 40

To 1,000 parts of commercially available diesel fuel having an octane number of 51.7 and a 50 percent evaporation temperature of 509° F. is added 3 parts of Stabilizer X. The resulting fuel is stable to oxidative deterioration.

EXAMPLE 41

To an antiknock fluid composition which is to be used as an additive to gasoline and which contains 61.5 parts of tetraethyllead, 17.9 parts of ethylene dibromide and 18.8 parts of ethylene dichloride is added, with agitation, 1.3 parts of Stabilizer Y. The resulting composition is stable for long periods when exposed to air.

EXAMPLE 42

With 1,000 parts of melted lard is mixed one part (0.1 percent) of Stabilizer Z. After cooling, the lard can be stored for long periods of time without the development of rancidity.

EXAMPLE 43

To 5,000 parts of olive oil is added one part of Stabilizer AA, and the mixture is agitated to produce a homogenous blend which is stable to oxidative deterioration for a long period.

I claim:
1. A compound especially adapted for stabilizing organic materials, said compound being selected from the group consisting of α,α'-(2-methoxy-4-tert-butyl-m-phenylene)-bis-(2,6-di-tert-butyl-p-cresol), α,α'-(5-tert-butyl-2 - methoxy - m-phenylene)-bis-[2,6-di(α-methylbenzyl)-p-cresol and α-(2-methoxy-3,5-di-tert-butylphenyl)-2,6-di-tert-butyl-p-cresol.
2. α,α' - (2 - methoxy - 5-tert-butyl-m-phenylene)-bis-(2,6-di-tert-butyl-p-cresol).
3. α,α'-(5-tert-butyl-2-methoxy - m - phenylene)-bis-[2,6-di(α-methylbenzyl)-p-cresol].
4. α-(2-methoxy - 3,5 - di-tert-butylphenyl)-2,6-di-tert-butyl-p-cresol.

References Cited

UNITED STATES PATENTS

| 2,745,726 | 5/1956 | Young et al. | 260—613 XR |
| 3,109,829 | 11/1963 | Bown | 260—613 XR |
| 3,220,979 | 11/1965 | McNelis | 260—47 |

OTHER REFERENCES

Buu-Hoi et al., Jour. Org. Chem., vol 17 (1952), pp. 1122–1127.

BERNARD HELFIN, Primary Examiner

U.S. Cl. X.R.

44—77, 78; 99—163, 164; 252—9, 59, 71, 56, 188; 260—45.85, 45.95, 398.5, 470, 481, 623, 624, 805, 807

UNITED STATES PATENT OFFICE
CERTIFICATE OF CORRECTION

Patent No. 3,476,814  Dated November 4, 1969

Inventor(s) Bernard R. Meltsner

It is certified that error appears in the above-identified patent and that said Letters Patent are hereby corrected as shown below:

Column 2, line 11, "$R_7$ and $R_8$" should read -- $R_6$ and $R_7$ --.
Column 5, line 3, that portion of the right-hand formula reading $$\underset{|}{OH_1} \quad \text{should read} \quad \underset{|}{OR_1}$$

line 25, the figure "2" should be inserted at the start of the equation; lines 29-30, that portion of the left-hand formula reading $$R_2 - \overset{|}{\underset{\underset{Cl}{||}}{C}} - R_3 \quad \text{should read} \quad R_2 - \overset{|}{\underset{\underset{Cl}{|}}{C}} - R_3$$

line 75, "10.66 percent" should read -- 10.06 percent --.
Column 16, Claim 1, line 32, "(2-methoxy-4-tert-butyl-" should read -- (2-methoxy-5-tert-butyl- --; line 35, insert "7" aft "p-cresol".

SIGNED AND
SEALED
MAY 26 1970

(SEAL)
Attest:

Edward M. Fletcher, Jr
Attesting Officer

WILLIAM E. SCHUYLER, JR.
Commissioner of Patents